US009043317B2

(12) United States Patent
Cosgrove et al.

(10) Patent No.: US 9,043,317 B2
(45) Date of Patent: May 26, 2015

(54) SYSTEM AND METHOD FOR EVENT-DRIVEN PRIORITIZATION

(71) Applicants: David Cosgrove, Portsmouth, NH (US); Christopher Burke, Greenland, NH (US); Timothy Pirozzi, Rochester, NH (US)

(72) Inventors: David Cosgrove, Portsmouth, NH (US); Christopher Burke, Greenland, NH (US); Timothy Pirozzi, Rochester, NH (US)

(73) Assignee: CA, Inc., New York, NY (US)

( * ) Notice: Subject to any disclaimer, the term of this patent is extended or adjusted under 35 U.S.C. 154(b) by 106 days.

(21) Appl. No.: 13/707,228

(22) Filed: Dec. 6, 2012

(65) Prior Publication Data

US 2014/0164364 A1 Jun. 12, 2014

(51) Int. Cl.
*G06F 17/30* (2006.01)

(52) U.S. Cl.
CPC .................. *G06F 17/3053* (2013.01)

(58) Field of Classification Search
CPC .................. G06F 17/30864; G06F 17/30867; G06F 17/30675; G06F 17/30882; G06F 3/0481; G06F 3/048; G06F 3/0482; G06F 9/4443; G06F 9/466; G06F 9/4843; G06F 9/5038; G06F 9/4881; G06F 17/3053; G06F 17/30; G06Q 30/02; G06G 5/14
USPC ............. 707/748, 723; 715/794, 795, 807.73; 714/4.1; 718/101, 102
See application file for complete search history.

(56) References Cited

U.S. PATENT DOCUMENTS

| | | | | |
|---|---|---|---|---|
| 7,689,622 B2* | 3/2010 | Liu et al. | ........................ | 707/751 |
| 7,779,014 B2* | 8/2010 | York et al. | .................... | 707/748 |
| 7,953,740 B1* | 5/2011 | Vadon et al. | .................. | 707/751 |
| 2004/0236596 A1* | 11/2004 | Chowdhary et al. | .............. | 705/1 |
| 2006/0259967 A1* | 11/2006 | Thomas et al. | .................. | 726/22 |
| 2007/0171028 A1* | 7/2007 | Crookham et al. | ....... | 340/323 R |
| 2008/0140484 A1* | 6/2008 | Akerman | .......................... | 705/7 |
| 2009/0284361 A1* | 11/2009 | Boddie et al. | .................. | 340/439 |
| 2009/0319295 A1* | 12/2009 | Kass-Hout et al. | ............... | 705/2 |
| 2011/0040666 A1* | 2/2011 | Crabtree et al. | ................ | 705/37 |
| 2011/0054968 A1* | 3/2011 | Galaviz | ........................ | 705/7.28 |
| 2011/0184928 A1* | 7/2011 | Vadon et al. | .................. | 707/706 |
| 2011/0238673 A1* | 9/2011 | Carter et al. | .................. | 707/748 |
| 2011/0246251 A1* | 10/2011 | Saunders et al. | ............. | 705/7.12 |

(Continued)

OTHER PUBLICATIONS

Xu Zhang ; LIESMARS, Wuhan Univ., Wuhan, China ; Shuming Bao ; Xinyan Zhu ; Kehua Su—"Spatial intelligence with spatial statistics" Published in: Geoinformatics, 2010 18th International Conference on Date of Conference: Jun. 18-20, 2010, pp. 1-6.*

(Continued)

*Primary Examiner* — Anh Ly
(74) *Attorney, Agent, or Firm* — Baker Botts L.L.P.

(57) ABSTRACT

Methods include receiving at a receiving device a plurality of reports, each corresponding to at least one item and comprising data associated with one or more performance metrics. The methods further include identifying events for each report corresponding to at least one item using the data in the report. In addition, the methods include determining a report score for each report based on a number and type of the identified events. The methods also include outputting the report scores.

15 Claims, 12 Drawing Sheets

(56) References Cited

U.S. PATENT DOCUMENTS

| | | | |
|---|---|---|---|
| 2011/0314145 A1* | 12/2011 | Raleigh et al. | 709/224 |
| 2012/0143840 A1* | 6/2012 | Vadon et al. | 707/706 |
| 2012/0158711 A1 | 6/2012 | Bharat et al. | |
| 2012/0259752 A1* | 10/2012 | Agee | 705/35 |
| 2013/0055282 A1* | 2/2013 | Yi | 718/104 |
| 2013/0226674 A1* | 8/2013 | Field et al. | 705/7.38 |
| 2013/0297581 A1* | 11/2013 | Ghosh et al. | 707/706 |
| 2013/0304818 A1* | 11/2013 | Brumleve et al. | 709/204 |
| 2014/0067486 A1* | 3/2014 | De Assuncao et al. | 705/12 |

OTHER PUBLICATIONS

Mingli Wu, Wenjie Li, Qin Lu, Kam-Fai Wong—"Event-Based Summarization Using Time Features" Computational Linguistics and Intelligent Text Processing Lecture Notes in Computer Science vol. 4394, 2007, pp. 563-574.*

"People You May Know: Connect with People You May Know," Facebook, Inc., available at http://www.facebook.com/help/501283333222485/ (searched on Jul. 1, 2013).

"About reddit," Reddit, Inc., available at http://www.reddit.com/about/ (searched on Jul. 1, 2013).

* cited by examiner

SYSTEM AND METHOD FOR EVENT-DRIVEN PRIORITIZATION

BACKGROUND

The present disclosure relates to data modeling and analysis and, more specifically, to a system and method for event-driven prioritization.

In data modeling and analysis, data about one or more entities may be collected and analyzed. Such modeling and analysis may be displayed to a user in many views. These views may reveal information about events corresponding to the one or more entities. The user may use such information to monitor and manage the performance of such entities. If many views exist, the user may have to navigate through multiple views in order to find such information.

BRIEF SUMMARY

According to an aspect of the present disclosure, a method may comprise receiving a plurality of reports. Each report may correspond to at least one item and comprise data associated with one or more performance metrics. The method may comprise identifying for each report events corresponding to at least one item using the data in the report. The method may comprise determining for each report a report score based on a number and type of the identified events. The method may comprise outputting the report scores.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
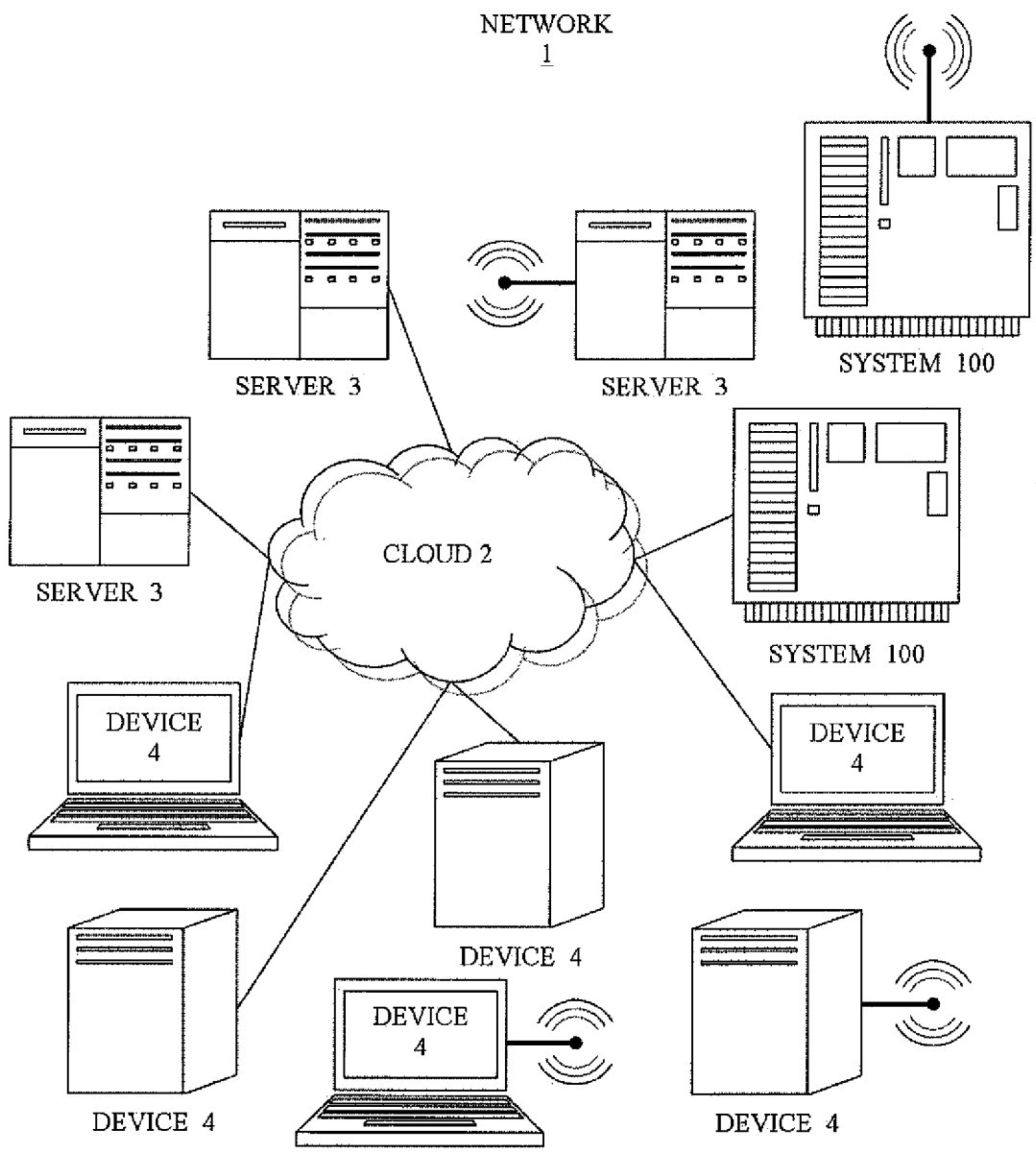
FIG. 1 is a schematic representation of an exemplary network 1 monitored by a device that performs event-driven prioritization.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to data modeling and analysis, systems and methods disclosed herein may be related to application performance management and infrastructure and operations management. Systems and methods disclosed herein may be applicable to a broad range of applications that monitor various parameters associated with various disciplines, such as, for example, industrial activities (e.g., power generation, manufacturing, refining, transportation, construction), commercial activities (e.g., sales, advertising, financial evaluation and modeling, inventory control), public health services (e.g., health care services, health care research, health care financing, public health management and administration, health information technology), IT systems (e.g., performance monitoring, environmental monitoring, utilization monitoring, stress-testing, access control, provisioning services, bandwidth monitoring, packet-routing), and other activities of importance to the user.

Referring now to infrastructure and operations management systems, existing systems may provide many reports or views of collected data. However, a user may not know which of the many reports may be the most important at a given time. Consequently, the user may be left to navigate through many potentially low priority reports in order to find reports of important information. Further, as more and more data is being collected and presented to users through reports, finding reports with important information may become more difficult and time-consuming. Systems and methods disclosed herein may provide a means for determining a relative prioritization of reports that are of interest to the user.

When managing infrastructure and operations systems, a user may desire to be presented with dynamically generated pages containing prioritized lists of reports of data that may assist the user with managing current issues revealed in the reports. For each report, a score may be calculated that indicates whether the report is of high or low priority. For example, a report with a higher associated score may be of higher priority.

Systems and methods disclosed herein may calculate scores for reports of data by examining the contents of each report. Reports can contain data about different types of items. For example, a report may contain data corresponding to network interfaces with high utilization. Once the corresponding items have been determined for each report, events (also referred to as alarms or alerts) associated with the items may be identified. For example, a report regarding network interfaces with high utilization may show that five of the network interfaces surpassed a threshold. The event may correspond with surpassing the threshold. For each report, the number of unique items with identified events and the total number of identified events may be stored. For example, there may be five unique network interfaces with events and a total of eight events amongst those network interfaces. A score may then be calculated for each report. An exemplary method of calculating the score is to apply a weight value to the number of unique items with identified events and by adding that to a weighted value for the total number of identified events. The weight values may allow for specifying that a part of the score is more important than another part of the score. For example, continuing with the above example, a weight value of 10 may be assigned to the number of unique items with identified events, and a weight value of 20 may be assigned to the total number of identified events.

Such systems and methods disclosed herein may also calculate scores for reports of data by storing and using the types of unique items with identified events and the types of identified events. The types of unique items may comprise, but are not limited to, servers, interfaces, processes, services, and other computer components, logical computer components, physical network entities, or logical network entities. The types of events may comprise, for example, low events where a low threshold was crossed and high events where a high threshold was crossed. A score may be calculated for each report by applying weight values to the types of unique items with identified events and by adding that to weighted values for the types of identified events. The weight values may allow for specifying that certain types of items or certain types of events are more important than other types of items or other types of events, respectively.

In some embodiments, systems and methods may compare the scores for the reports to determine how important each report is in comparison to the other reports. The reports may be ranked or prioritized based on their relative importance. A display or page containing a ranked list of reports may be generated for a user. This may allow a user to be presented with the highest priority reports first.

Referring now to FIG. 1, a network 1 for transmitting and receiving information and for provisioning services now is described. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations.

Cloud 2 may facilitate wired or wireless communications of information and provisioning of services among users that are connected to cloud 2.

Network 1 may comprise one or more servers 3 and other devices operated by service providers, information providers, and other parties. Network 1 also may comprise one or more devices 4 utilized by service consumers, information consumers, and other parties. Service providers and information providers may provide information and services to information consumers and service consumers utilizing the one or more servers 3, which connect to the one or more devices 4 via cloud 2. The services may comprise, for example, information technology services, financial services, business services, access services, monitoring services, operations services, infrastructure services, and other resource-provisioning services. Servers 3 may comprise, for example, one or more of general purpose computing devices, specialized computing devices, mainframe devices, wired devices, wireless devices, monitoring devices, infrastructure devices, and other devices configured to provide one or more of services and information to information consumers and service consumers. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service consumers and information consumers. Exemplary items may include network 1, cloud 2, servers 3, and devices 4.

Moreover, network 1 may comprise one or more system 100 that may collect information from and about network 1, cloud 2, servers 3, devices 4, and other devices connected to cloud 2. System 100 may be, for example, one or more of a general purpose computing device, a specialized computing device, a wired device, a wireless device, a mainframe device, an infrastructure device, a monitoring device, and any other device configured collect data from one or more data sources (e.g., servers, sensors, networks, interfaces, other devices). System 100 may connect to cloud 2 and monitor network 1, cloud 2, servers 3, devices 4, and other devices connected to cloud 2 for available information from or about network 1, cloud 2, servers 3, devices 4, and other devices connected to cloud 2 and available information (e.g., performance information, access information, user information, physical conditions, error information, location and geography, ambient conditions, efficiency, associated costs, utilization, availability, other variable information,) about the services and information provided from service providers and information providers. By collecting variable data associated with network 1, cloud 2, servers 3, devices 4, and other devices connected to cloud 2, system 100 may generate rich datasets or reports regarding operational parameters and conditions for network 1, cloud 2, servers 3, devices 4, other devices connected to cloud 2, and other systems, events, services, and processes monitored by such devices. System 100 may utilize these reports to provide users with pertinent information about performance conditions for network 1, cloud 2, servers 3, devices 4, other devices connected to cloud 2, and other systems, events, services, and processes monitored by such devices. In this manner, system 100 may identify current issues associated with network 1, cloud 2, servers 3, devices 4, other devices connected to cloud 2, and other systems, events, services, and processes monitored by such devices in response to the collected information deviating from predetermined threshold values, averages, or other statistics.

In some configurations, one or more of servers 3 and devices 4 may comprise system 100. In other configurations, system 100 may be separate from servers 3 and devices 4.

Figure 2:
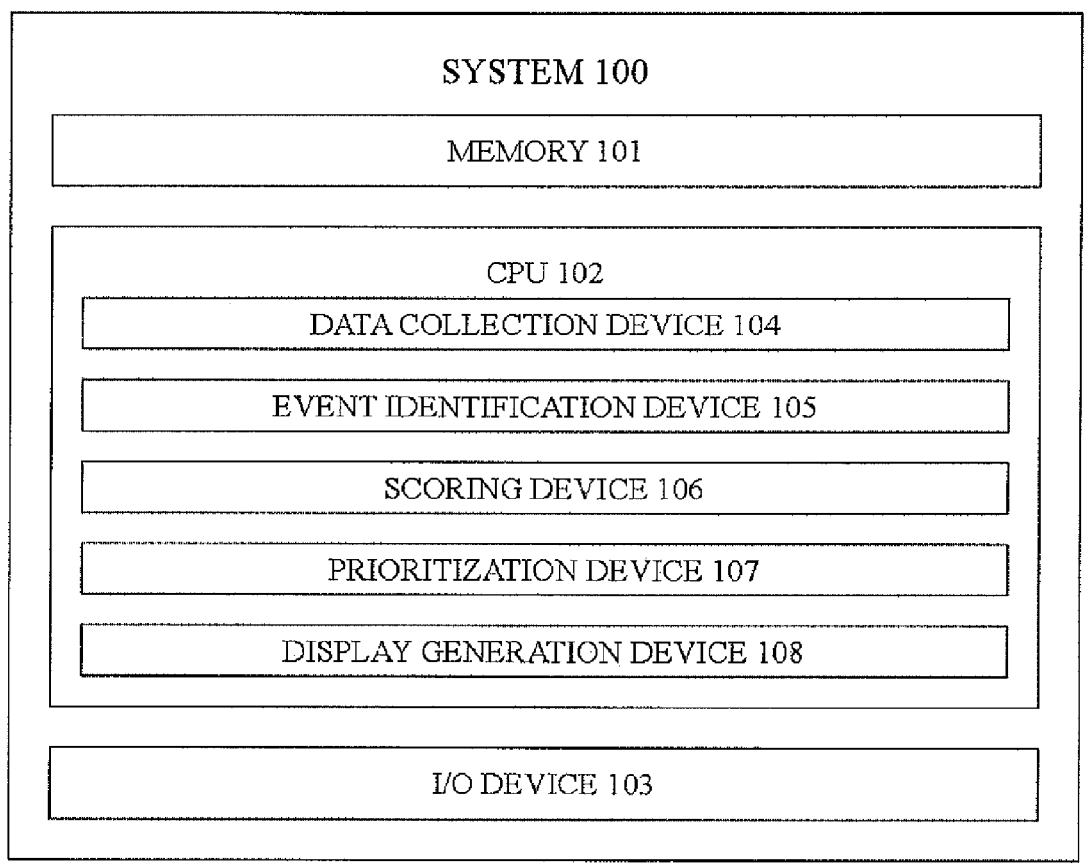
FIG. 2 is a schematic representation of an exemplary system configured to collect data from reports, identify events in the report data, determine scores for the reports, and rank the reports based on their scores.

Referring now to FIG. 2, system 100, which may collect data from network 1, cloud 2, servers 3, devices 4, other devices connected to cloud 2, and other devices connected with or incorporated into system 100 and identify current issues associated with such servers and devices, now is described. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of a data collection device 104, an event identification device 105, a scoring device 106, a prioritization device 107, and a display generation device 108. In particular configurations, one or more of data collection device 104, event identification device 105, scoring device 106, prioritization device 107, and display generation device 108 may be implemented on one or more different CPUs, which may be comprised in remote or local devices.

I/O device 103 may receive one or more of data from cloud 2, data from other devices and sensors connected to system 100, input from a user and provide such information to CPU 102. I/O device 103 may transmit data to cloud 2, may transmit data to other devices connected to system 100, and may transmit a notification to a user (e.g., display a message, make a sound, send an email, make a telephone call). Further, I/O device 103 may implement one or more of wireless and wired communication between system 100 and other devices.

Figure 3:
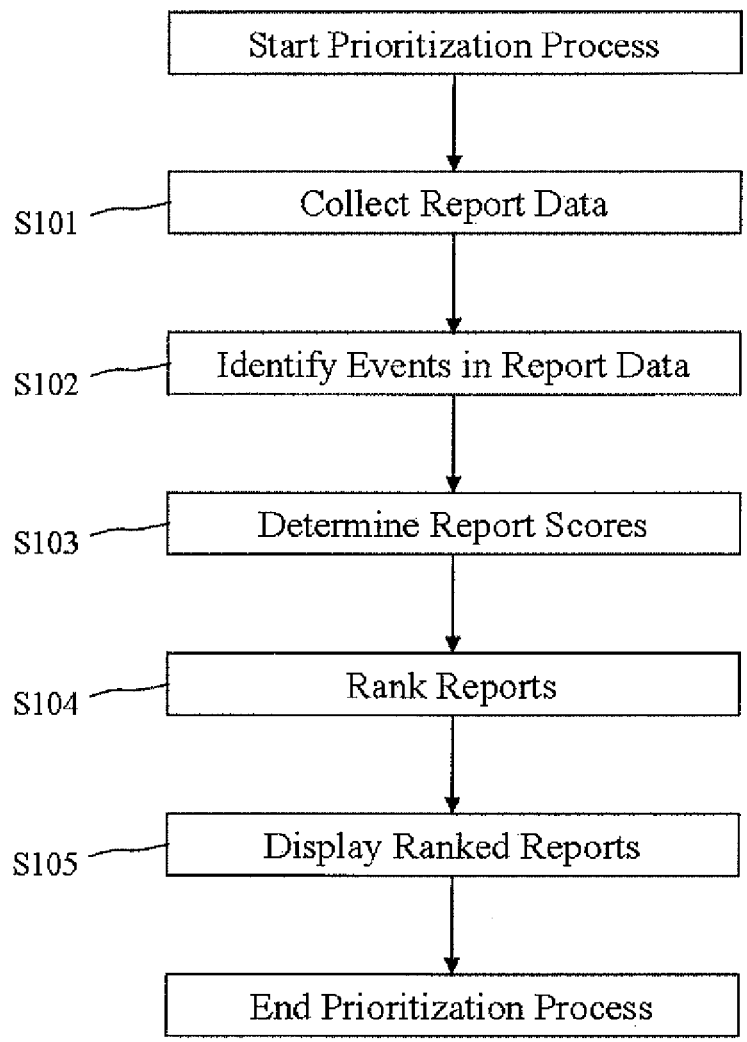
FIG. 3 illustrates an exemplary process of collecting data from reports, identifying events in the report data, determining the scores for the reports, and ranking the reports based on their scores.

Referring now to FIGS. 3-6, exemplary processes performed by collection device 104, event identification device 105, scoring device 106, prioritization device 107, and display generation device 108 now are described. FIG. 3 depicts a process for collecting data from reports, identifying events in the report data, determining the scores for the reports, and ranking the reports based on their scores. In S101, data collection device 104 may collect or receive reports, each corresponding to at least one item and comprising data associated with one or more performance metrics. For IT systems, items may comprise, for example, computer components (e.g., processors, motherboards, memory, hard drives, video cards), logical computer components (e.g., software, databases), physical network entities (e.g., nodes, links), or logical network entities (e.g., processes, services, virtual machines, virtual private networks, representations of network connections). For other activities, items may comprise commercial items (e.g., sales, inventory, financial instruments), public health items (e.g., diseases, pregnancies, mortality), or economic items (e.g., trade in goods and services, national accounts, unemployment). Performance metrics may comprise port utilization, memory utilization, CPU utilization, disk capacity, or average reachability response time. In S102, event identification device 105 may identify events. Events may be referred to as alarms, hot spots, or other activities corresponding to one or more items in the reports. Such events may comprise data for an item in the report that crosses a threshold value, data for an item in the report that deviates more than a predetermined amount from an average, or data for an item in the report that deviates more than predetermined amount from an order statistic. A threshold value may be a predetermined percentage, quantity, or other numeric value; an average may be a mean, median, mode, or other average statistic; and an order statistic may be a minimum, maximum, quantile, or other order statistic. For example, an event may be identified when data on CPU utilization for a device 4 crosses a threshold (e.g., 90%). As another example, an event may be identified when data on the number of bytes received by a server 3 deviates more than one standard deviation from a mean. Such events may also comprise different types (e.g., low threshold event, high threshold event, minor event, major event, critical event). For example, a minor event may be identified when data on CPU utilization for a device 4 crosses a low threshold (e.g., 50%); a major event may be identified when data on CPU utilization for a device 4 crosses a middle threshold (e.g., 70%); and a critical event may be identified when data on CPU utilization for a device 4 crosses a high threshold (e.g., 90%).

In S103, scoring device 106 may determine a report score for each report collected in S101. Determining a report score for a report may be based on a number of identified events corresponding to items in that report; a number of unique items with identified events in that report; types of events corresponding to items in that report; types of unique items with identified events in that report; or any combination of these measures. In certain configurations, determining a report score may further comprise assigning weight values to the measures. In such configurations, determining a report score may involve calculating sub-scores by multiplying the value of each measure by its assigned weight and totaling the sub-scores.

In S104, prioritization device 107 may determine a rank or priority for each of the reports collected in S101. Determining the rank for each of the reports may be based on the report scores of each of the reports. In certain configurations, the reports with lower report scores may be assigned a higher rank, and the reports with higher report scores may be assigned a higher rank. In other configurations, the reports with higher report scores may be assigned a higher rank, and the reports with lower report scores may be assigned a lower rank. For example, if data collection device 104 collected or received three reports, Report 1, Report 2, and Report 3, and scoring device 106 determined report scores of 42, 66, and 65 for each of the reports, respectively, then prioritization device 107 may determine that Report 1 is ranked third, Report 2 is ranked first, and Report 3 is ranked second. Still in other configurations, the reports with more volatile scores or scores with any other measurable characteristic may be assigned a higher rank, and the scores with less volatile scores or scores with any other measurable characteristic may be assigned a lower rank. In S105, display generation device 108 may display a plurality of reports organized based on the determined ranks of the reports. Displaying a plurality of reports may comprise, for example, displaying a list of prioritized reports on a user terminal such as a mobile phone, a tablet computer, a laptop computer, a desktop computer, an audio receiving system, a television, or another type of terminal device, configured to display video data or play audio data received from a server. Yet another example of displaying a plurality of reports may comprise displaying a subset of reports that comprise reports from the plurality that have the highest rankings or reports from the plurality that have report scores that are higher than a predetermined value. In certain configurations, S104 and S105 may be omitted.

Figure 4:
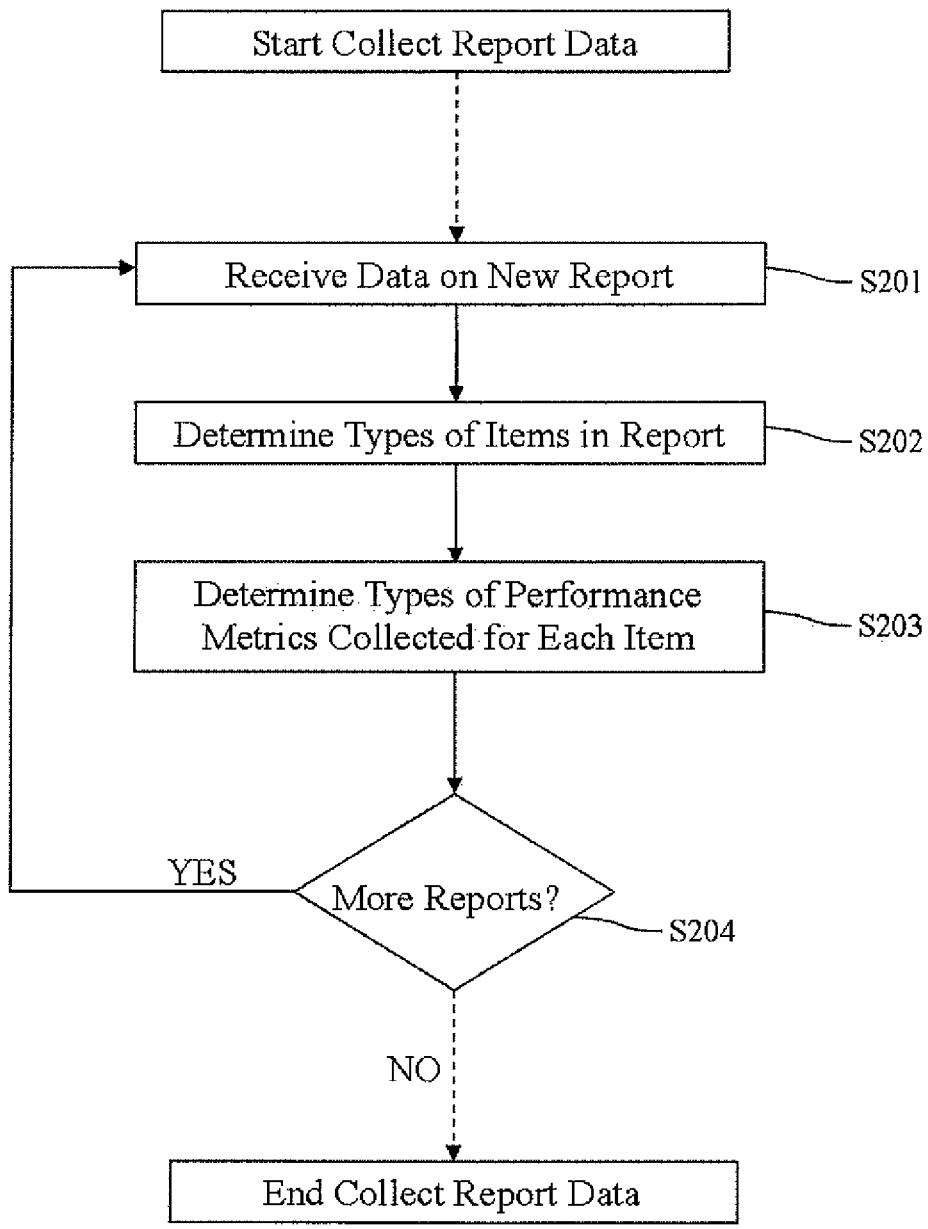
FIG. 4 illustrates an exemplary process of collecting data from reports.

Referring to FIG. 4, which provides an exemplary detailed view of S101, data collection device 104 may collect or receive data corresponding to reports. The reports may correspond to at least one item and comprise data associated with one or more performance metrics, as described above. In S201, data collection device 104 receives data on a new report. In S202 and S203, data collection device 104 may determine the types of items in the new report and determine the types of performance metrics collected for each of the items in the new report. In S204, after data collection device 104 determines the types of items and the types of performance metrics in the report, data collection device 104 may then check whether there are more reports that have not been collected or received. In certain configurations, data collection device 104 may receive data on several reports at once, such that the processes in S201, S202, and S203 may be performed for more than one report at the same time.

Figure 7A:
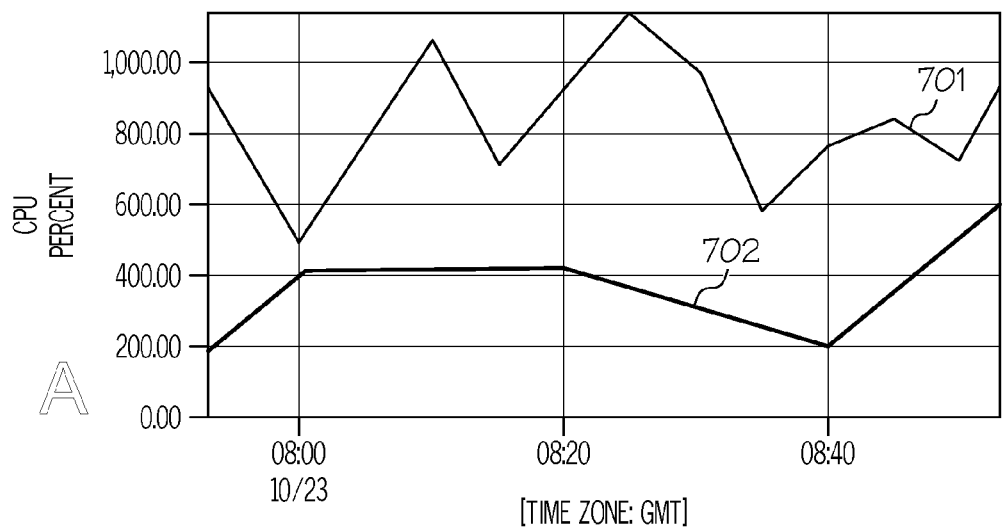
FIGS. 7A-7D depict examples of reports.
Figure 7B:
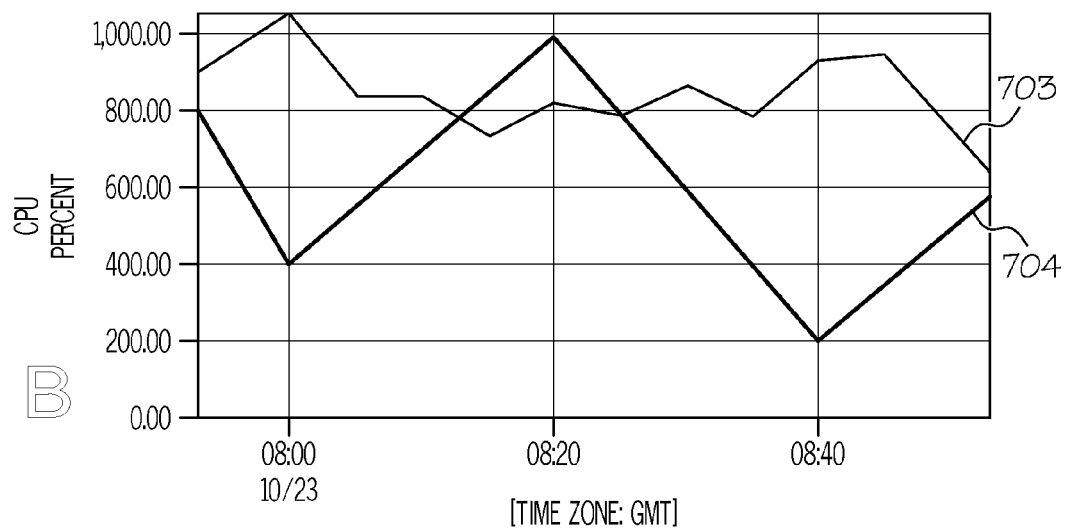
Figure 7C:
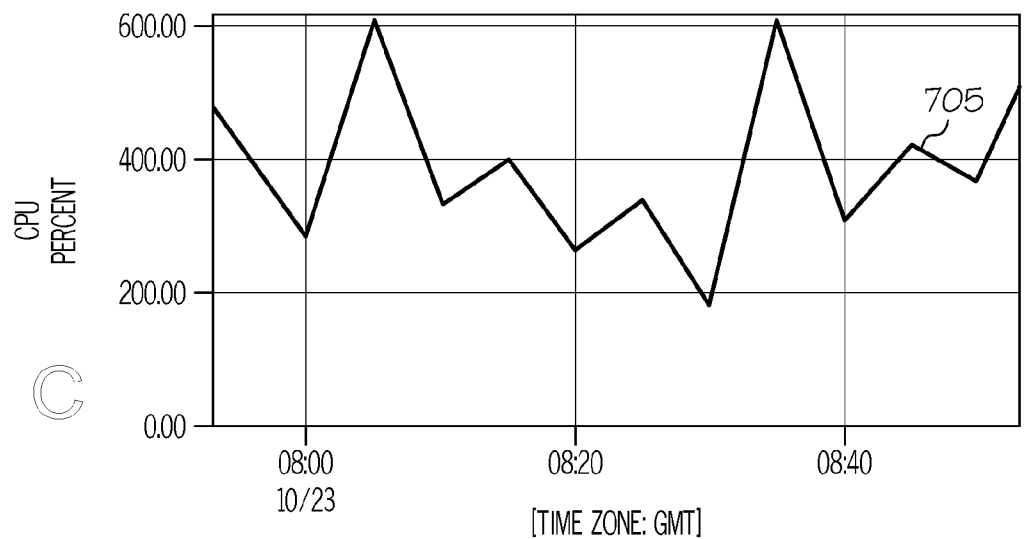
Figure 7D:
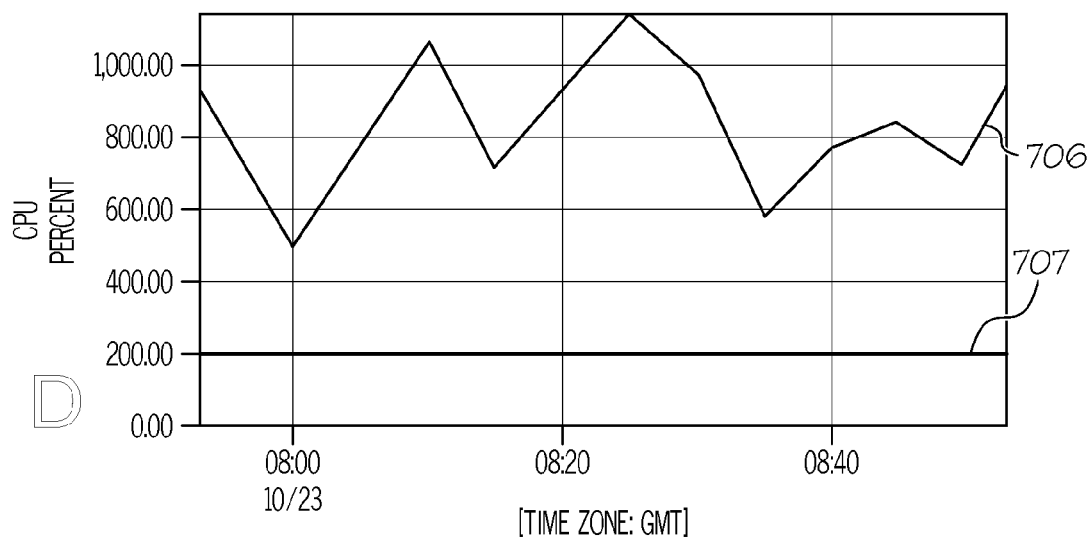

FIGS. 7A-7D depict examples of reports collected from devices 4. Although FIGS. 7A-7D depict graphs, reports may be any collection of data regarding one or more items. In FIG. 7A, Report A corresponds to two items, a first device 4 (item 701) and a second device 4 (item 702), and comprises data associated with one performance metric, CPU utilization percent. In FIG. 7B, Report B corresponds to two items, a third device 4 (item 703) and a fourth device 4 (item 704), and comprises data associated with one performance metric, CPU utilization percent. In FIG. 7C, Report C corresponds to one item, a fifth device 4 (item 705), and comprises data associated with one performance metric, CPU utilization percent. And in FIG. 7D, Report D corresponds to two items, a sixth device 4 (item 706) and a seventh device (item 707), and comprises data associated with one performance metric, CPU utilization percent. In S201, data collection device 104 may receive data on each of Reports A, B, C, and D. In S202, data collection device 104 may determine that Report A corresponds to items 701 and 702; Report B corresponds to two additional items, items 703 and 704; Report C corresponds to one additional item, item 705; and Report D corresponds to two additional items, items 706 and 707. And in S203, data collection device 104 may determine that each of Reports A, B, C, and D comprise data on one performance metric, CPU utilization percent.

In certain configurations, the two determining processes in S202 and S203 may be performed concurrently. In particular configurations, S204 may be omitted. In other configurations, data collection device 104 may store the entirety of the collected reports in memory 101 in FIG. 2.

Figure 5:
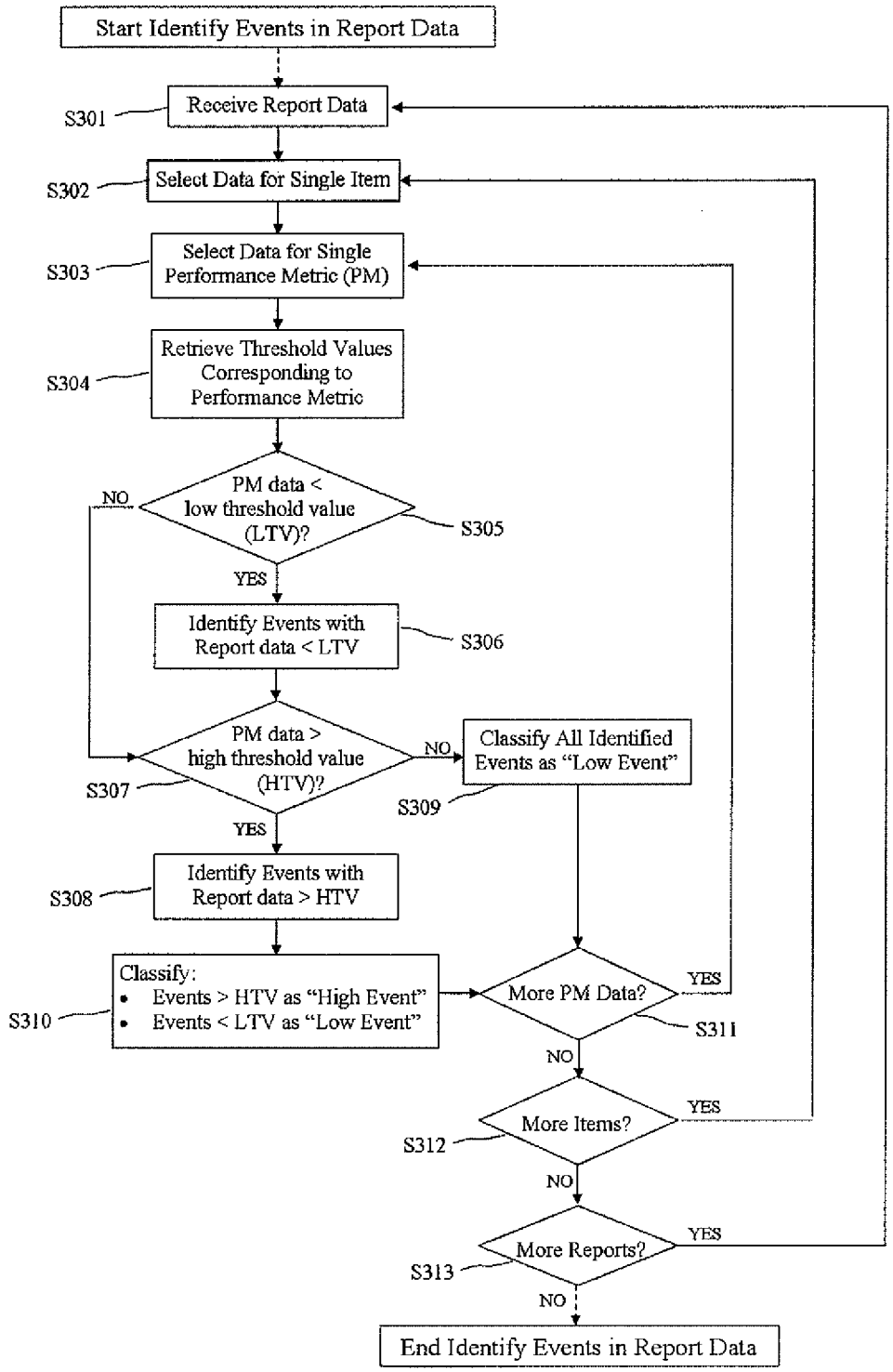
FIG. 5 illustrates an exemplary process of identifying events in reports.

Referring to FIG. 5, which provides an exemplary detailed view of S102, event identification device 105 may identify events corresponding to one or more items in the reports. Specifically, in an aspect of the disclosure, event identification device 105 may identify events comprising determining when a portion of the data in a report crosses a threshold value. In S301, event identification device 105 may receive report data. In S302 and S303, event identification device 105 may select data for a single item in the report and select data for a single performance metric corresponding to that single item in the report. In S304, event identification device 105 may retrieve threshold values corresponding to the selected performance metric. Such threshold values may be different for the same performance metric across items and across reports. When event identification device 105 determines that the data for the selected performance metric does not cross a low threshold value (S305: NO), the process may proceed to S307. When event identification device 105 determines that the data for the selected performance metric crosses a low threshold value (S305: YES), event identification device 105 may identify events by determining when one or more portions of the data for the selected performance metric are lower than the low threshold value in S306. When event identification device 105 determines that the data for the selected performance metric does not cross a high threshold value (S307: NO), event identification device 105 may classify any events that were identified in S306 as a "Low Event" or other comparable classification. When event identification device 105 determines that the data for the selected performance metric crosses a high threshold value (S307: YES), event identification device 105 may identify events by determining when one or more portions of the data for the selected performance metric are higher than the high threshold value in S308. After identifying any and all of the events, in S310, event identification device 105 may classify any events that were identified in S306 as a "Low Event" or other comparable classification and any events that were identified in S308 as a "High Event" or other comparable classification.

In certain configurations, S307 and S308 may be performed before S305 and S306. In such configurations, in S309, event identification device 105 may classify any events that were identified in S308 as a "High Event" or other comparable classification. In other configurations, S305/S306 and S307/S308 may be performed concurrently, and S309 may be omitted. In particular configurations, the threshold values may comprise fixed or preset values, calculated values comprising data values that correspond to predetermined deviations from an average, or order statistics. In other configurations, the threshold values may be a predetermined subset of the data points with particular characteristics that are defined in computer-readable instructions such as quantiles.

After event identification device 105 has finished identifying and classifying any and all events for the selected performance metric, event identification device 105 may determine whether the selected item comprises data associated with any performance metrics other than the selected performance metric. If event identification device 105 determines that there are other associated performance metrics (S311: YES), then the process may proceed back to S303 and event identification device 105 may select data associated with a new performance metric. The process may then repeat S303 through S311 until event identification device 105 identifies any and all of the events in all of the performance metrics for the selected item. If event identification device 105 determines that there are no other associated performance metrics (S311: NO), then the process may proceed to S312.

After event identification device 105 has finished identifying and classifying any and all events for all of the performance metrics for the selected item, event identification device 105 may determine whether the received report data corresponds to any other items. If event identification device 105 determines that there are other corresponding items (S312: YES), then the process may proceed back to S302 and event identification device 105 may select data for the new item. The process may then repeat S302 through S312 until event identification device 105 identifies any and all of the events in all of the items in the received report data. If event identification device 105 determines that there are no other corresponding items (S312: NO), then the process may proceed to S313.

In S313, event identification device 105 may determine whether there are more reports. If event identification device determines that there are more reports (S313: YES), then the process may proceed back to S301 and receive report data for a new report. The process may then repeat S301 through S313 until event identification device 105 identifies any and all of the events for all of the reports. If event identification device 105 determines that there are no other reports (S313: NO), then the process may terminate.

In certain configurations, event identification device 105 may process several reports at once, such that the processes in S301-S313 may be performed for more than one report at the same time. Moreover, in some embodiments, not all of the items and not all of the performance metrics in reports may be evaluated. For example, if a report contains both CPU utilization performance metrics and network congestion performance metrics for three network servers, event identification device 105 may be programmed to only identify events for the CPU utilization performance metrics and/or for only one or two of the three network servers.

Figure 8A:
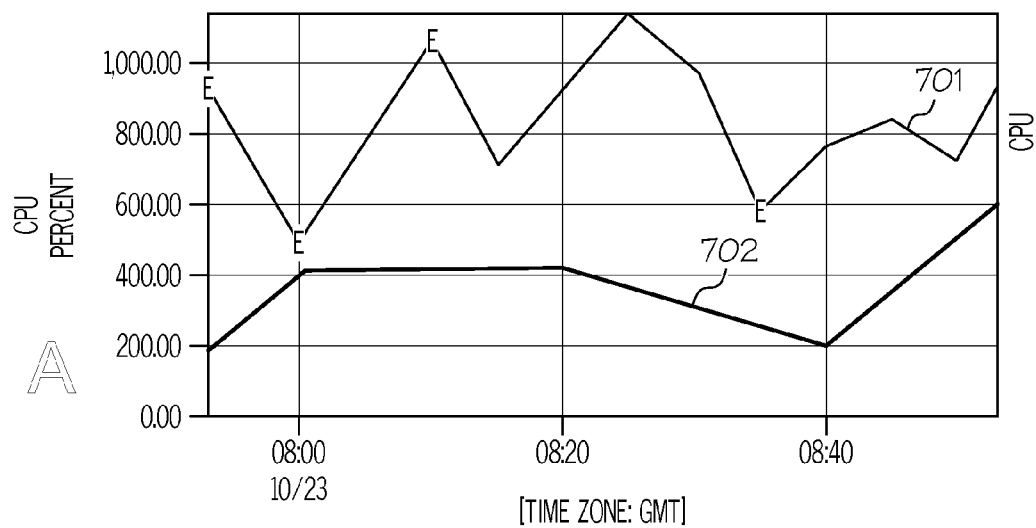
FIGS. 8A-8D depict examples of the reports in FIGS. 7A-7D with identified events.
Figure 8B:
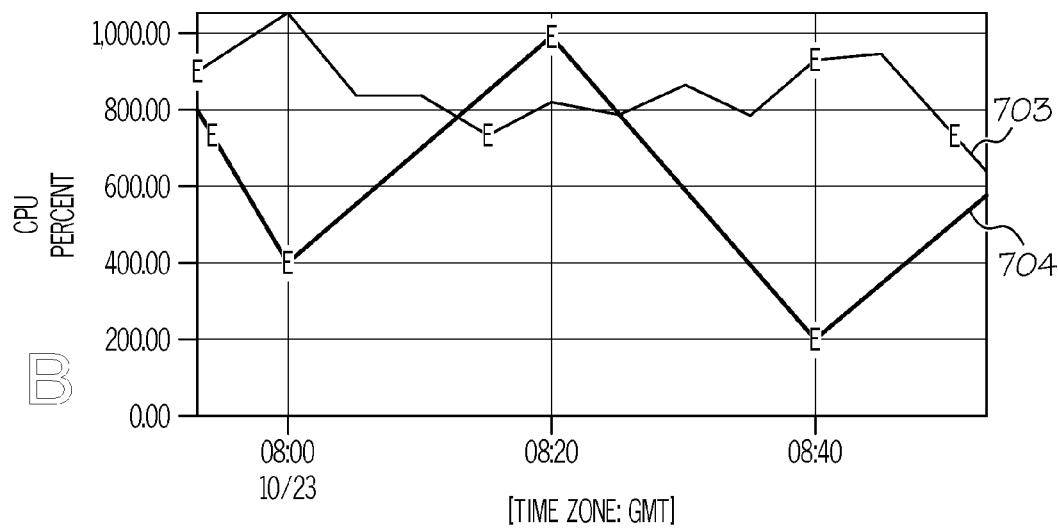
Figure 8C:
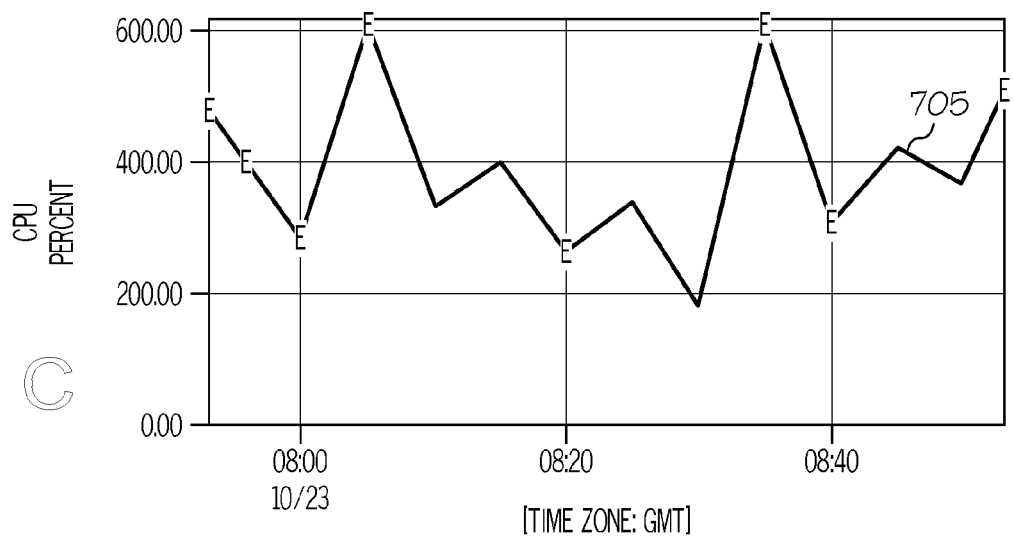
Figure 8D:
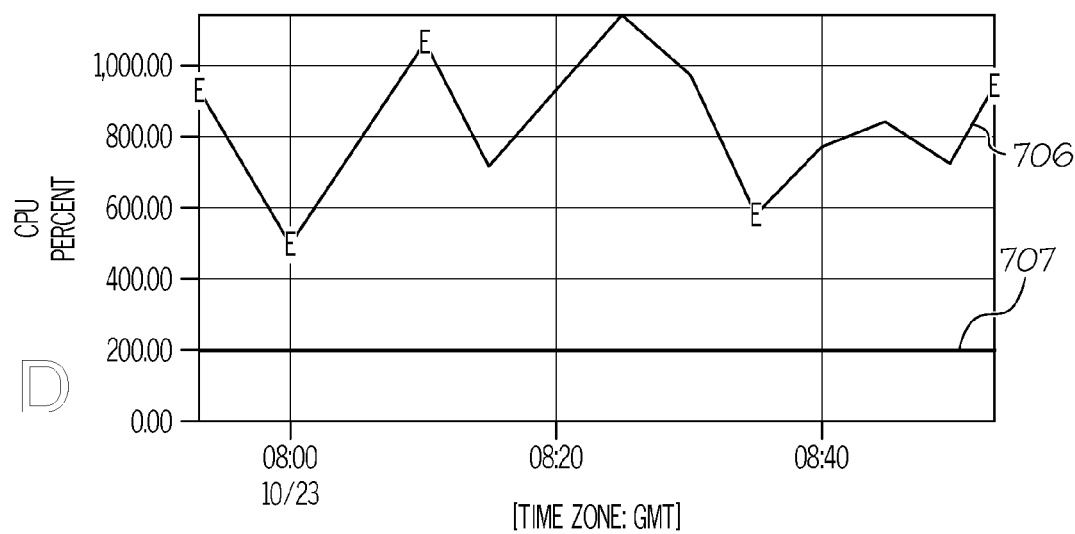

FIGS. 8A-8D depict examples of reports collected from devices 4 with identified events. Specifically, FIGS. 8A-8D continue from the examples in FIGS. 7A-7D, respectively. As described above, data collection device 104 may determine that Report A corresponds to two items, a first device 3 (light line) and a second device 3 (dark line); Report B corresponds to two additional items, a third device 3 (light line) and a fourth device 3 (dark line); Report C corresponds to one additional item, a fifth device 3 (light line); and Report D corresponds to two additional items, a sixth device 3 (light line) and a seventh device 3 (dark line). Further, data collection device 104 may determine that each of Reports A, B, C, and D comprise data on one performance metric, CPU utilization percent. In FIG. 8A, four events are identified in the performance data for item 701 and no events are identified in the performance data for item 702 in Report A. In FIG. 8B, four events are identified in the performance data for item 703 and four events are identified in the performance data for item 704 in Report B. In FIG. 8C, eight events are identified in the performance data for item 705 in Report C. And in FIG. 8D, five events are identified in the performance data for item 706 and no events are identified in the performance data for item 707 in Report D. All identified events are marked with the letter "E" in FIGS. 8A-8D. In S301, event identification device 105 may receive report data for a first report, Report A. In S302, event identification device 105 may select data for a first item in Report A, item 701. In S303, event identification device 105 may select data for a single performance metric corresponding to item 701 in Report A, CPU utilization percent. In S304, event identification device 105 may retrieve threshold values corresponding to CPU utilization percent for item 701 in Report A. In S305 through S310, event identification device 105 may identify and classify four events, two Low Events and two High Events, in the CPU utilization percent for item 701 in Report A. In S311, event identification device 105 may determine that there are no other performance metrics associated with item 701 and proceed onto S312. In S312, event identification device 105 may determine that there is a second item in Report A, item 702, and proceed back to S302. In S302, event identification device 105 may select data for item 702. In S303, event identification device may select data for a single performance metric corresponding to item 702, CPU utilization percent. In S304, event identification device 105 may retrieve threshold values corresponding to CPU utilization percent for item 702. In S305 through S310, event identification device 105 may identify and classify no events in the CPU utilization percent for item 702 in Report A. In S311, event identification device 105 may determine that there are no other performance metrics associated with item 702 and proceed onto S312. In S312, event identification device 105 may determine that there are no other items in Report A and proceed onto S313. In S313, event identification device 105 may determine that there are other reports, namely, Reports B, C, and D. Event identification device 105 may then repeat S301 through S313 for each of Reports B, C, and D. After event identification device 105 has identified all of the events in each of these reports, event identification device 105 may terminate the process.

Figure 6A:
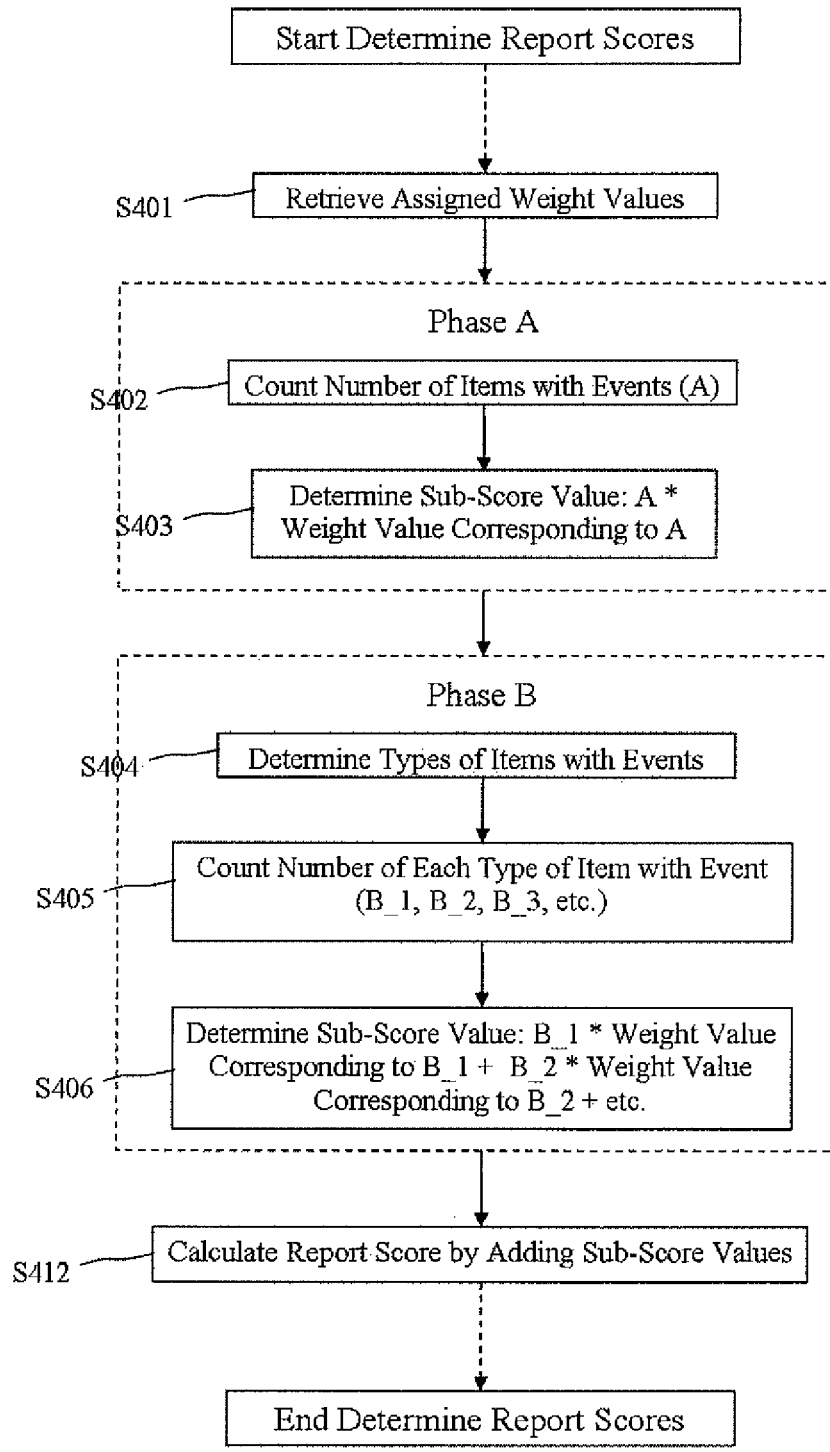
FIG. 6A illustrates an exemplary process of determining scores for reports based on a number of unique items that have identified events and types of unique items that have identified events.
Figure 6B:
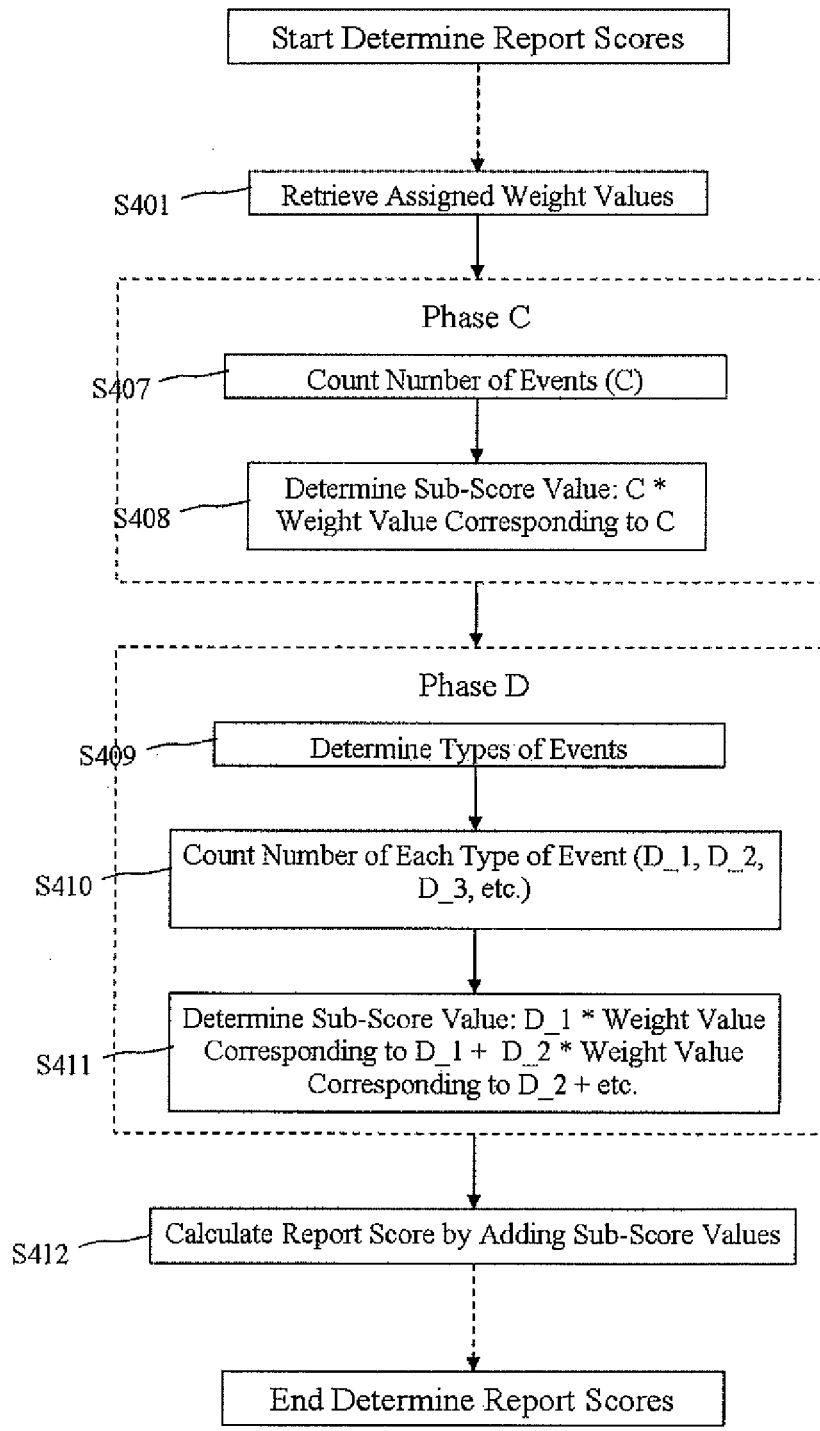
FIG. 6B illustrates an exemplary process of determining scores for reports based on a number of identified events and types of identified events.

Referring now to FIGS. 6A and 6B, which provide an exemplary detailed view of S103, scoring device 106 may determine a report score for each report. FIG. 6A depicts a process of determining a report score based on a number of unique items with identified events in the report and types of unique items with identified events in the report. In S401, scoring device 106 may retrieve assigned weight values for the number of unique items with identified events in the report and the types of unique items with identified events in the report. As described above, the types of items may comprise, for example, computer components, logical computer components, physical network entities, or logical network entities in IT systems. Such weight values may comprise fractions, percentages, or natural numbers. In certain configurations, such weight values may be the same among the number of unique items with identified events in the report and the types of unique items with identified events in the report. In other configurations, such weight values may be different among the number of unique items with identified events in the report and the types of unique items with identified events in the report. For example, a weight value corresponding to the number of unique items with identified events may be 20; a weight value corresponding to a first type of item, servers, may be 5; and a weight value corresponding to a second type of item, modems, may be 10. In such configurations, the different weight values that are assigned to each of the number of unique items with identified events in the report and the types of unique items with identified events in the report may change how much each measure contributes to the report score of a report. In particular configurations, a user may dictate the weight values that are assigned to each measure thereby varying how important each measure is to the report score. In other configurations, the weight values may be defined in the computer-readable instructions.

In Phase A, scoring device 106 may calculate a first sub-score corresponding to the number of unique items with identified events in the report. In S402, scoring device 106 may count the number of unique items with events. The value corresponding to the number of unique items with events may be known as "A". In S403, scoring device 106 may determine the first sub-score by multiplying "A" by the weight value corresponding to the number of unique items with identified events in the report, otherwise known as the weight value corresponding to "A". In Phase B, scoring device 106 may calculate a second sub-score corresponding to the types of unique items with identified events in the report. In S404, scoring device 106 may determine the different types of items with identified events. In S405, scoring device 106 may count the number of each type of item with identified events. The values corresponding to the numbers of each type of item with identified events may be known as "B_1", "B_2", "B_3", and so forth, with "B_n" corresponding to the last type of item with identified events, where "n" represents the unique number that identifies a type of item. In S406, scoring device 106 may determine the second sub-score by multiplying "B_1", "B_2", "B_3", and so forth by the weight values corresponding to each type of item with identified events, otherwise known as the weight value corresponding to "B_1", the weight value corresponding to "B_2", the weight value corresponding to "B_3", and so forth, and by totaling all of the resulting products. Scoring device 106 may then calculate the report score by totaling all of the sub-scores.

Similar to FIG. 6A, FIG. 6B depicts a process of determining a report score based on a number of identified events corresponding to items in the report and types of events corresponding to items in the report. In S401, scoring device 106 may retrieve assigned weight values for the number of identified events in the report and the types of identified events in the report. Such weight values may comprise fractions, percentages, or natural numbers. In certain configurations, the weight values may be the same among the number of identified events in the report and the types of identified events in the report. In other configurations, such weight values may be different among the number of identified events in the report and the types of identified events in the report. For example, a weight value corresponding to the number of identified events may be 10; a weight value corresponding to a first type of event, a minor event associated with CPU utilization, may be 5; a weight value corresponding to a second type of event, a major event associated with CPU utilization, may be 10; a weight value corresponding to a third type of event, a critical event associated with CPU utilization, may be 20; a weight value corresponding to a fourth type of event, a low event associated with memory usage, may be 1; and a weight value corresponding to a fifth type of event, a major event associated with memory usage, may be 2. In such configurations, the different weight values that are assigned to each of the number of identified events in the report and the types of identified events in the report may change how much each measure contributes to the report score of a report. In particular configurations, a user may dictate the weight values that are assigned to each measure thereby varying how important each measure is to the report score. In other configurations, the weight values may be defined in the computer-readable instructions.

In Phase C, scoring device 106 may determine a third sub-score corresponding to the number of identified events. In S407, scoring device 106 may count the number of identified events. The value corresponding to the number of identified events may be known as "C". In S408, scoring device 106 may determine the third sub-score by multiplying "C" by the weight value corresponding to the number of identified events in the report, otherwise known as the weight value corresponding to "C". In Phase D, scoring device 106 may calculate a fourth sub-score corresponding to the types of identified events in the report. In S409, scoring device 106 may determine the different types of identified events. In S410, scoring device 106 may count the number of each type of identified event. The values corresponding to the numbers of each type of identified event may be known as "D_1", "D_2", "D_3", and so forth, with "D_n" corresponding to the last type of identified event, where "n" represents the unique number that identifies a type of event. In S411, scoring device 106 may determine the fourth sub-score by multiplying "D_1", "D_2", "D_3", and so forth by the weight values corresponding to each type of identified event, otherwise known as the weight value corresponding to "D_1", the weight value corresponding to "D_2", the weight value corresponding to "D_3", and so forth, and by totaling all of the resulting products. In S412, scoring device 106 may then calculate the report score by totaling all of the sub-scores.

As described above, scoring device 106 may determine a report score based on the number of identified events corresponding to items in that report; the number of unique items with identified events in that report; the types of events corresponding to items in that report; the types of unique items with identified events in that report; or any combination of these measures. Thus, in certain configurations, scoring device 106 may determine a first sub-score corresponding to a first measure, a second sub-score corresponding to a second measure, a third sub-score corresponding to a third measure, a fourth sub-score corresponding to a fourth measure, or any combination of sub-scores. In such configurations, scoring device 106 may perform Phase A, Phase B, Phase C, Phase D, or any combination of phases in any order or concurrently. In such configurations, Phase A, Phase B, Phase C, Phase D, or any combination of phases may also be omitted from the scoring process. In other configurations, a user or another device may input a process for determining the report scores or the process for determining the report scores may be defined in computer-readable code.

TABLE 1

| Report | Phase A | | | Phase C | | | Report Score |
|---|---|---|---|---|---|---|---|
| | Unique Items with Events (A) | Weight Value Corresponding to A | Sub-score Value | Events (C) | Weight Value Corresponding to C | Sub-score Value | |
| A | 1 | 20 | 20 | 4 | 10 | 40 | 60 |
| B | 2 | 20 | 40 | 8 | 10 | 80 | 120 |
| C | 1 | 20 | 20 | 8 | 10 | 80 | 100 |
| D | 1 | 20 | 20 | 5 | 10 | 50 | 70 |

Table 1 provides an example of report scores that are determined for reports with identified events. Specifically, Table 1 continues from the examples in FIGS. 7A-7D and 8A-8D. As described above, event identification device 105 may identify in Report A, four events in the performance data for item 701 and no events in the performance data for item 702; in Report B, four events in the performance data for item 703 and four events in the performance data for item 704; in Report C, eight events in the performance data for item 705; and in Report D, five events in the performance data for item 706 and no events in the performance data for item 707. Some of these events may be Low Events, and some of these events may be High Events. As shown in Table 1, a report score may be calculated for each report based on the number of unique items with identified events and the number of identified events in the report. In S401, scoring device 106 may retrieve weight values that correspond to the number of unique items with identified events and the number of identified events. In Table 1, a weight value of 20 corresponds to the number of unique items with identified events, and a weight value of 10 corresponds to the number of identified items. In Phase A, scoring device 106 may calculate a first sub-score for each of the reports by counting the number of unique items with identified events in the report and by multiplying such number by the weight value corresponding to the number of unique items with identified events. Applying this process to the reports, Report A has a first sub-score of 20 because it has one unique item, item 701, with identified events; Report B has a first sub-score of 40 because it has two unique items, items 703 and 704, with identified events; Report C has a first sub-score of 20 because it has one unique item, item 705, with identified events; and Report D has a first sub-score of 20 because it has one unique item, item 706, with identified events. In Phase C, scoring device 106 may calculate a second sub-score for each of the reports by counting the number of identified events in the report and by multiplying such number by the weight value corresponding to the number of identified items. Applying this process to the reports, Report A has a second sub-score of 40 because it has four identified events; Report B has a second sub-score of 80 because it has eight identified events; Report C has a second sub-score of 80 because it has eight identified events; and Report D has a second sub-score of 50 because it has five identified events. In S412, scoring device 106 may then calculate the report score for each report by totaling the first sub-score and the second-sub-score of each report. Applying this process to the reports, Report A receives a report score of 60; Report B receives a report score of 120; Report C receives a report score of 100; and report D receives a report score of 70.

Figure 9:
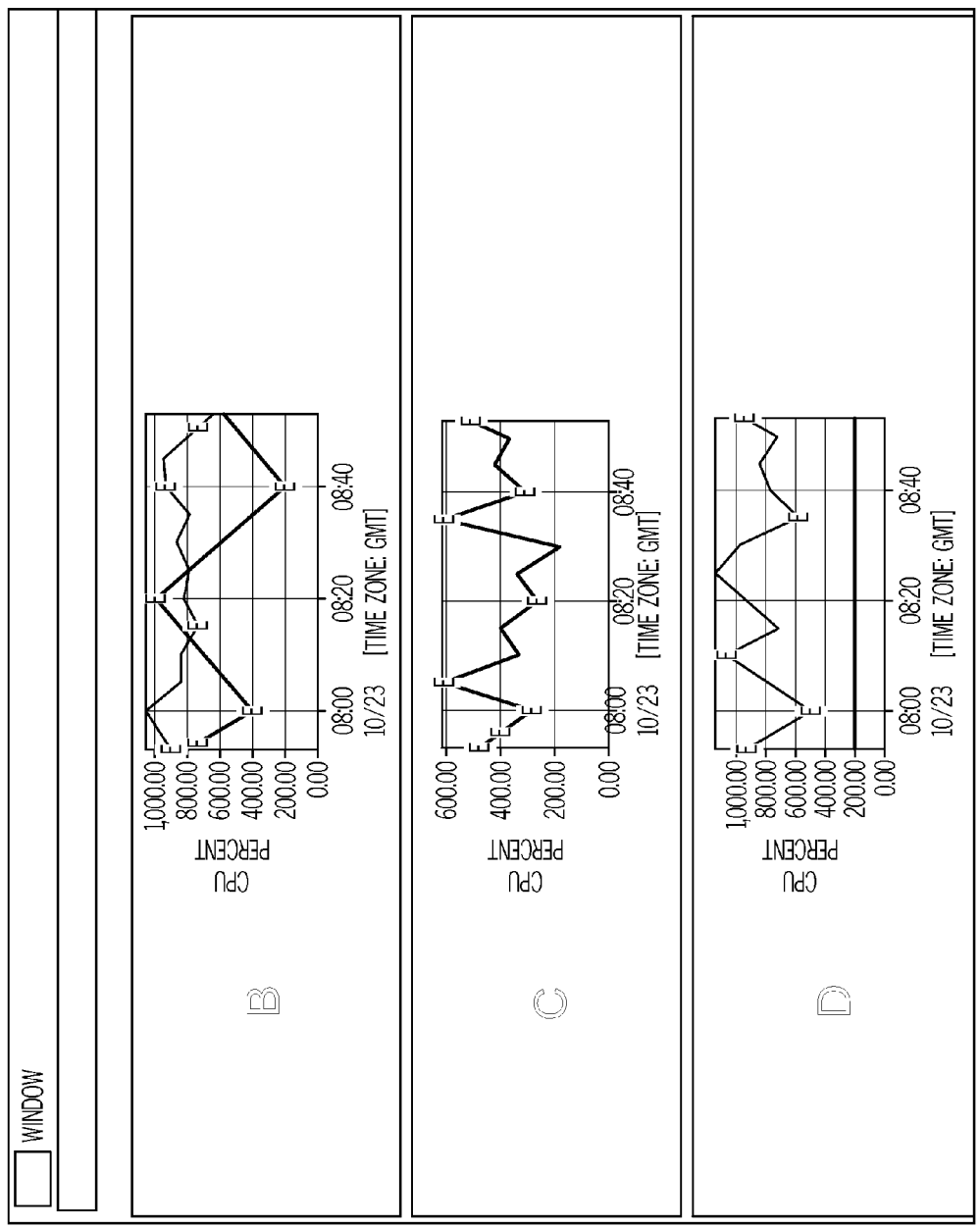
FIG. 9 depicts an example of determining a rank for each report in FIGS. 7A-7D and displaying the reports organized based on their determined ranks.

FIG. 9 then depicts an example of determining a rank for each report in a plurality of reports and displaying the plurality of reports organized based on the determined ranks. Specifically, FIG. 9 continues from the examples in FIGS. 7A-7D, 8A-8D, and Table 1. In FIG. 9, prioritization device 107 may determine a rank for each of the reports based on the report scores. As described above, scoring device 106 may determine that Report A has a report score of 60; Report B has a report score of 120; Report C has a report score of 100; and report D has a report score of 70. Prioritization device 107 may determine or assign a higher rank to a report with a higher score and a lower rank to a report with a lower score. Display generation device 108 may then display a subset of reports that include reports from the plurality that have the highest few rankings or reports from the plurality that have report scores that are higher than a predetermined value. In FIG. 9, Report B is ranked the highest because it had the highest score; Report C is ranked the second highest because it had the second highest score; Report D is ranked third highest because it had the third highest score; and Report A is ranked fourth highest or lowest because it had the fourth highest score. Only Reports B, C, and D may be displayed because they are the reports that have the highest three rankings. Alternatively, only Reports B, C, and D may be displayed because they have report scores that are higher than a predetermined value (e.g., 65).

The flowcharts and diagrams in FIGS. 1-9 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
receiving at a receiving device a plurality of reports, each corresponding to one or more items and comprising data associated with one or more performance metrics;
for each report:
identifying events corresponding to one or more items using the data in the report; and
determining a report score based on a number and type of the identified events; outputting the report scores,
determining a rank for each of the plurality of reports based on the report scores; and
displaying the plurality of reports organized based on the determined ranks,
wherein determining a report score further comprises assigning weights to the number of the identified items, the number of the identified events, the types of the identified events, and the types of the identified items.

2. The method of claim 1:
wherein an item comprises a computer component, a logical computer component, a physical network entity, or a logical network entity; and
wherein performance metrics are selected from the group comprising: port utilization, memory utilization, CPU utilization, disk capacity, and average reachability response time.

3. The method of claim 1, wherein identifying events comprises identifying when: a portion of the data in the report crosses a threshold value; a portion of the data in the report deviates more than a predetermined amount from an average; or a portion of the data in the report deviates more than a predetermined amount from an order statistic.

4. The method of claim 1, further comprising:
identifying items corresponding to the identified events; and
wherein determining a report score further comprises determining a report score based on a number and type of the identified items.

5. The method of claim 1, wherein a type of identified event is based on an amount of deviation from a predetermined value, the type of identified event being one of a low event and a high event,
wherein the amount of deviation associated with a low event is less than an amount of deviation associated with a high event.

6. A system comprising:
a receiving device configured to receive a plurality of reports, each corresponding to one or more items and comprising data associated with one or more performance metrics;
for each report:
a first identifying device configured to identify events corresponding to one or more items using the data in the report; and
a first determining device configured to determine a report score based on a number and type of the identified events;
an outputting device configured to output the report scores,
a second determining device configured to determine a rank for each of the plurality of reports based on the report scores; and
a displaying device configured to display the plurality of reports organized based on the determined ranks,
wherein the first determining device is further configured to determine a report score by assigning weights to the number of the identified items, the number of the identified events, the types of the identified events, and the types of the identified items.

7. The system according to claim 6;
wherein an item comprises a computer component, a logical computer component, a physical network entity, or a logical network entity; and
wherein performance metrics are selected from the group comprising: port utilization, memory utilization, CPU utilization, disk capacity, and average reachability response time.

8. The system according to claim 6, wherein the identifying device is configured to identify when: a portion of the data in the report crosses a threshold value; a portion of the data in the report deviates more than a predetermined amount from an average; or a portion of the data in the report deviates more than a predetermined amount from an order statistic.

9. The system according to claim 6, further comprising:
a second identifying device configured to identify items corresponding to the identified events; and
wherein the first determining device is further configured to determine a report score based on a number and type of the identified items.

10. The system according to claim 6, wherein a type of identified event is based on an amount of deviation from a predetermined value, the type of identified event being one of a low event and a high event,
wherein the amount of deviation associated with a low event is less than an amount of deviation associated with a high event.

11. A computer program product comprising:
a non-transitory computer readable storage medium having computer readable program code embodied therewith, the computer readable program code comprising:
computer readable program code configured to receive at a receiving device a plurality of reports, each corresponding to one or more items and comprising data associated with one or more performance metrics;
for each report:
computer readable program code configured to identify events corresponding to the one or more items using the data in the report; and
computer readable program code configured to determine a report score based on a number and type of the identified events;
computer readable program code configured to output the report scores,
computer readable program code configured to determine a rank for each of the plurality of reports based on the report scores; and
computer readable program code configured to display the plurality of reports organized based on the determined ranks,
wherein the computer readable program code configured to determine a report score further comprises computer readable program code configured to determine a report score by assigning weights to the number of the identified items, the number of the identified events, the types of the identified events, and the types of the identified items.

12. The computer program product according to claim 11:
wherein an item comprises a computer component, a logical computer component, a physical network entity, or a logical network entity; and
wherein performance metrics are selected from the group comprising: port utilization, memory utilization, CPU utilization, disk capacity, and average reachability response time.

13. The computer program product according to claim 11, wherein the computer readable program code configured to identify events comprises computer readable program code configured to identify events when: a portion of the data in the report crosses a threshold value; a portion of the data in the report deviates more than a predetermined amount from an average; or a portion of the data in the report deviates more than a predetermined amount from an order statistic.

14. The computer program product according to claim 11, further comprising:
computer readable program code configured to identify items corresponding to identified events; and
wherein the computer readable program code configured to determine a report score further comprises computer readable program code configured to determine a report score based on a number and type of the identified items.

15. The computer program product according to claim 11, wherein a type of identified event is based on an amount of deviation from a predetermined value, the type of identified event being one of a low event and a high event,
wherein the amount of deviation associated with a low event is less than an amount of deviation associated with a high event.

* * * * *